(12) United States Patent
Kashima et al.

(10) Patent No.: US 6,892,714 B2
(45) Date of Patent: May 17, 2005

(54) EXHAUST GAS REFLUX APPARATUS FOR INTERNAL COMBUSTION ENGINE

(75) Inventors: Souji Kashima, Wako (JP); Toshimitsu Ikeda, Wako (JP); Akihito Kasai, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/700,051

(22) Filed: Nov. 4, 2003

(65) Prior Publication Data

US 2004/0154597 A1 Aug. 12, 2004

(30) Foreign Application Priority Data

Nov. 6, 2002  (JP) ........................................ 2002-323094
Oct. 7, 2003  (JP) ........................................ 2003-347986

(51) Int. Cl.[7] .............................. F02M 25/07; F01L 1/34
(52) U.S. Cl. .............................. 123/568.14; 123/90.16; 123/90.23; 123/90.39
(58) Field of Search ................................. 123/321, 322, 123/347, 348, 568.14, 90.15, 90.16, 90.17, 90.22, 90.23, 90.39, 90.4, 90.41

(56) References Cited

U.S. PATENT DOCUMENTS

| | | | | |
|---|---|---|---|---|
| 4,848,284 A | * | 7/1989 | Konno | .................. 123/90.16 |
| 5,603,292 A | * | 2/1997 | H.ang.kansson | ....... 123/568.14 |
| 5,960,755 A | * | 10/1999 | Diggs et al. | ............ 123/568.14 |
| 6,234,126 B1 | * | 5/2001 | Kaye | ........................ 123/90.23 |
| 6,354,254 B1 | * | 3/2002 | Usko | ..................... 123/568.14 |
| 6,505,589 B1 | * | 1/2003 | Hayman et al. | ......... 123/90.23 |
| 6,594,996 B2 | * | 7/2003 | Yang | .......................... 123/321 |

FOREIGN PATENT DOCUMENTS

JP          55-137245          10/1980

* cited by examiner

Primary Examiner—Willis R. Wolfe, Jr.
(74) Attorney, Agent, or Firm—Arent Fox, PLLC

(57) ABSTRACT

An exhaust gas reflux apparatus for an internal combustion engine includes one-way connection means provided between an intake rocker arm and an exhaust rocker arm. The one-way connection means moves between a non-operating position where the intake and exhaust rocker arms are released and an operating position where the intake and exhaust rocker arms are connected to open the exhaust valve only when the intake rocker arm rocks in a valve opening direction of the intake valve. An actuator for switching the one-way connection means between the non-operating position and the operating position is connected to the one-way connection means. Thus, an exhaust gas is sucked into a combustion chamber from an exhaust port using a general exhaust valve in an intake stroke, when exhaust gas reflux is required.

5 Claims, 18 Drawing Sheets

EXHAUST GAS REFLUX APPARATUS FOR INTERNAL COMBUSTION ENGINE

BACKGROUND OF THE INVENTION

1. Field of the Invention

The present invention relates to an improvement in an exhaust gas reflux apparatus for an internal combustion engine that refluxes an exhaust gas into a combustion chamber to inhibit an excessive increase in combustion temperature of air-fuel mixture and to reduce NOx concentration in the exhaust gas.

2. Description of the Related Art

A known exhaust gas reflux apparatus for an internal combustion engine is, as disclosed in Japanese Utility Model Laid-Open No. 55-137245, such that an exhaust gas reflux valve is provided between a combustion chamber and an exhaust port, the exhaust gas reflux valve is opened in an interlocked manner with an intake rocker arm that is driven to open an intake valve, depending on operation conditions of the internal combustion engine, and an appropriate amount of exhaust gas is sucked into the combustion chamber from the exhaust port during an intake stroke.

Such a construction of the exhaust gas reflux apparatus for an internal combustion engine has a problem in output performance of the engine, since a cylinder head requires a specific exhaust gas reflux valve besides an intake valve and an exhaust valve generally used, and the exhaust gas reflux valve prevents provision of sufficiently large opening areas of an intake port and an exhaust port opening into a limited ceiling surface area of the combustion chamber.

SUMMARY OF THE INVENTION

The invention is achieved in view of the above described problems, and has an object to provide an exhaust gas reflux apparatus for an internal combustion engine that allows an exhaust gas to be sucked into a combustion chamber from an exhaust port using a general exhaust valve, when exhaust gas reflux is required, to thereby solve the above described problem.

In order to achieve the object, according to a first feature of the invention, there is provided an exhaust gas reflux apparatus for an internal combustion engine having an intake rocker arm and an exhaust rocker arm that are pivotably supported on an engine body and driven to open and close an intake valve and an exhaust valve, respectively, wherein one-way connection means is provided between the intake rocker arm and the exhaust rocker arm, the one-way connection means moving between a non-operating position where the intake and exhaust rocker arms are released and an operating position where the intake and exhaust rocker arms are connected to open the exhaust valve only when the intake rocker arm rocks in a valve opening direction of the intake valve, and wherein an actuator for switching the one-way connection means between the non-operating position and the operating position is connected to the one-way connection means.

According to the first feature, when exhaust gas reflux is required, the actuator is used to move the one-way connection means to the operating position during an intake stroke, and thus the exhaust rocker arm is driven from the intake rocker arm to open the exhaust valve to suck an exhaust gas into a combustion chamber from an exhaust port. In this case, during an exhaust stroke, the one-way connection means does not interfere with rocking of the exhaust rocker arm, causing no problem in opening and closing of the exhaust valve. When the exhaust gas reflux is not required, the one-way connection means is returned to the non-operating position, to thereby avoid interference between the intake rocker arm and the exhaust rocker arm. Therefore, as compared with a conventional apparatus having a special exhaust gas reflux valve, opening areas of an intake port and the exhaust port opening into a ceiling surface of the combustion chamber can be increased, to thereby improve output performance of the internal combustion engine. Besides, a simple configuration can be obtained since there is no increase in the number of valves.

In addition to the first feature, according to a second feature of the invention, the actuator has a negative pressure type configuration that operates when a negative pressure introduced into a negative pressure chamber of the actuator reaches a predetermined value or more, and the negative pressure chamber communicates with a negative pressure taking-out hole opening into an intake path of a carburetor, the negative pressure of the predetermined value or more being taken out from the intake path through the negative pressure taking-out hole in a predetermined middle opening degree area of a throttle valve.

According to the second feature, the actuator is not operated and the exhaust gas reflux is not performed in an area from a fully-closed position to a predetermined low opening degree and an area with a predetermined high opening degree or more, other than the middle opening degree area of the throttle valve, thus allowing stable combustion and reduction in fuel consumption during low speed operation including idling of the internal combustion engine, and securing high output during high load operation.

In addition to the first and the second features, according to a third feature of the invention, the one-way connection means includes an auxiliary rocker arm that is pivotably supported on the engine body so as to rock in an interlocked manner with the intake rocker arm and switched between a non-operating position and an operating position by the actuator, and a connection piece that is provided on the exhaust rocker arm and engages the auxiliary rocker arm only when the intake rocker arm rocks in the valve opening direction of the intake valve at the operating position of the auxiliary rocker arm.

According to the third feature, the one-way connection means having a simple configuration is used to drive the exhaust rocker arm from the intake rocker arm to reflux the exhaust gas, thus providing an inexpensive exhaust gas reflux apparatus.

In addition to any one of the first to the third features, according a fourth feature of the invention, the actuator is configured so that an operation stroke changes depending on an engine load, and the one-way connection means is configured so that a valve opening lift of the exhaust valve by the one-way connection means is changed depending on the operation stroke of the actuator.

According to the fourth feature, the valve opening lift of the exhaust valve by the one-way connection means can be controlled depending on the engine load, and thus the amount of exhaust gas refluxed into the combustion chamber is adjusted depending on the engine load, to thereby allow stable combustion and reduction in NOx concentration in the exhaust gas.

In addition to the fourth feature, according to a fifth feature of the invention, the one-way connection means includes an auxiliary rocker arm that is pivotably supported on the engine body so as to rock in an interlocked manner with the intake rocker arm, the operation position of the one-way connection means being controlled from an operation start point to an operation limit point by the actuator, and a connection piece that is provided on the exhaust rocker arm and engages the auxiliary rocker arm only when the intake rocker arm rocks in the valve opening direction of the intake valve within a range from the operation start point to the operation limit point of the auxiliary rocker arm, and the connection piece is formed so that a gap between the connection piece and the auxiliary rocker arm changes depending on movement of the auxiliary rocker arm from the operation start point to the operation limit point.

According to the fifth feature, the one-way connection means having a simple configuration is used to drive the exhaust rocker arm from the intake rocker arm, to thereby reflux the exhaust gas and adjust the amount of refluxed exhaust gas depending on the engine load.

The foregoing and other objects, features and advantages of the invention will become more apparent from the following descriptions of preferred embodiments with reference to the accompanying drawings.

DETAILED DESCRIPTION OF THE PREFERRED EMBODIMENTS

Figure 1:
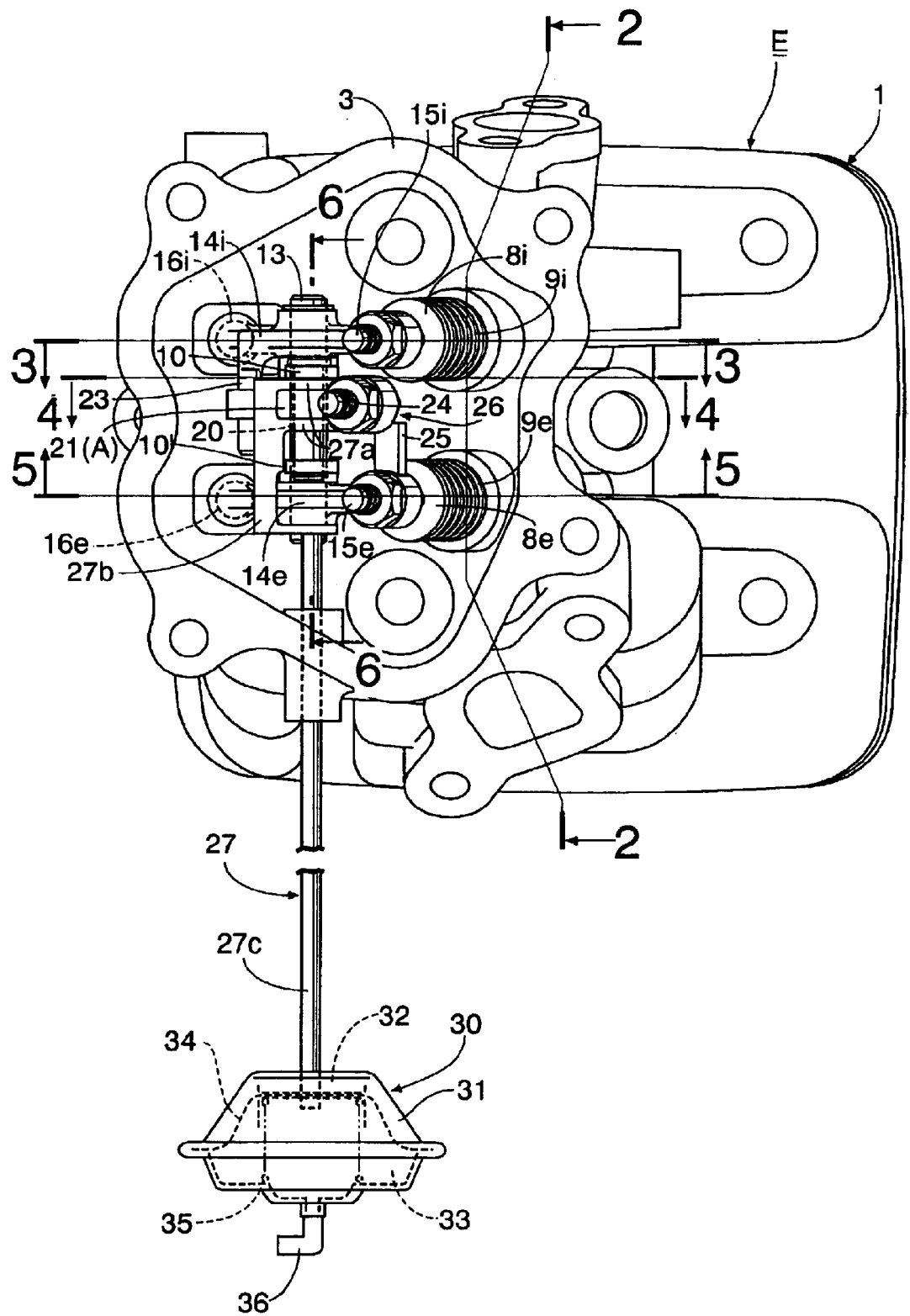
FIG. 1 is a plan view of an internal combustion engine including an exhaust gas reflux apparatus according to a first embodiment of the invention.
Figure 2:
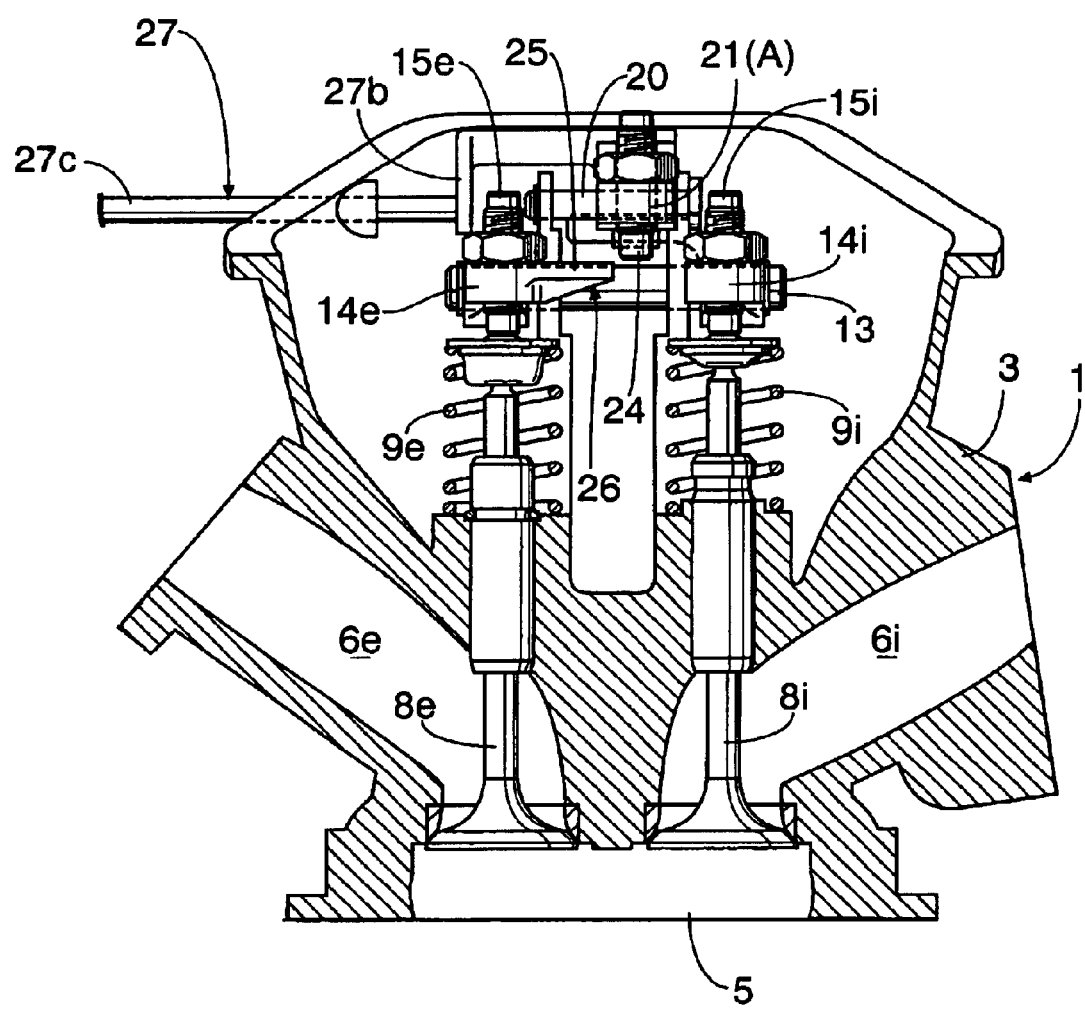
FIG. 2 is a sectional view taken along the line 2—2 in FIG. 1.
Figure 3:
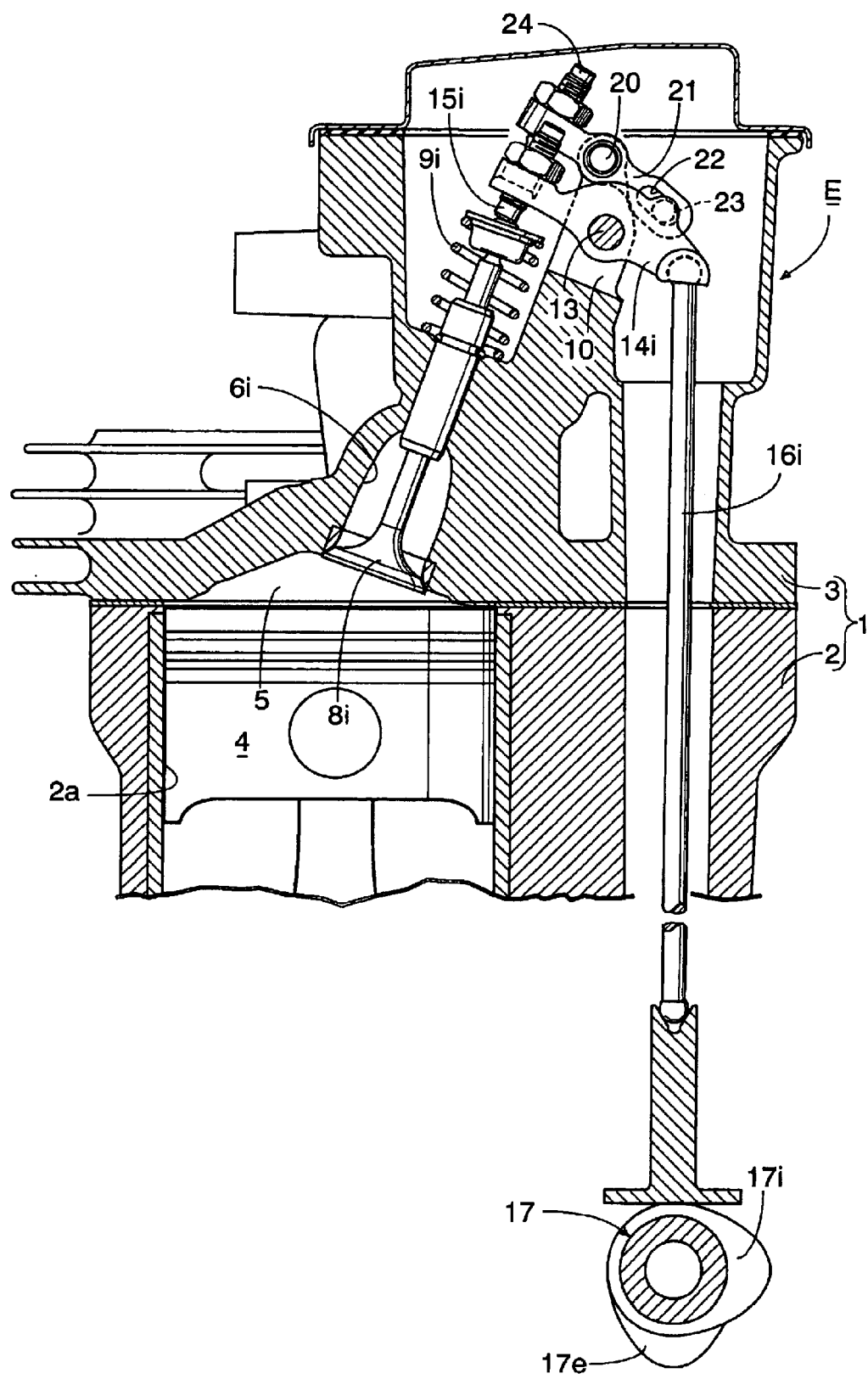
FIG. 3 is a sectional view taken along the line 3—3 in FIG. 1.
Figure 4:
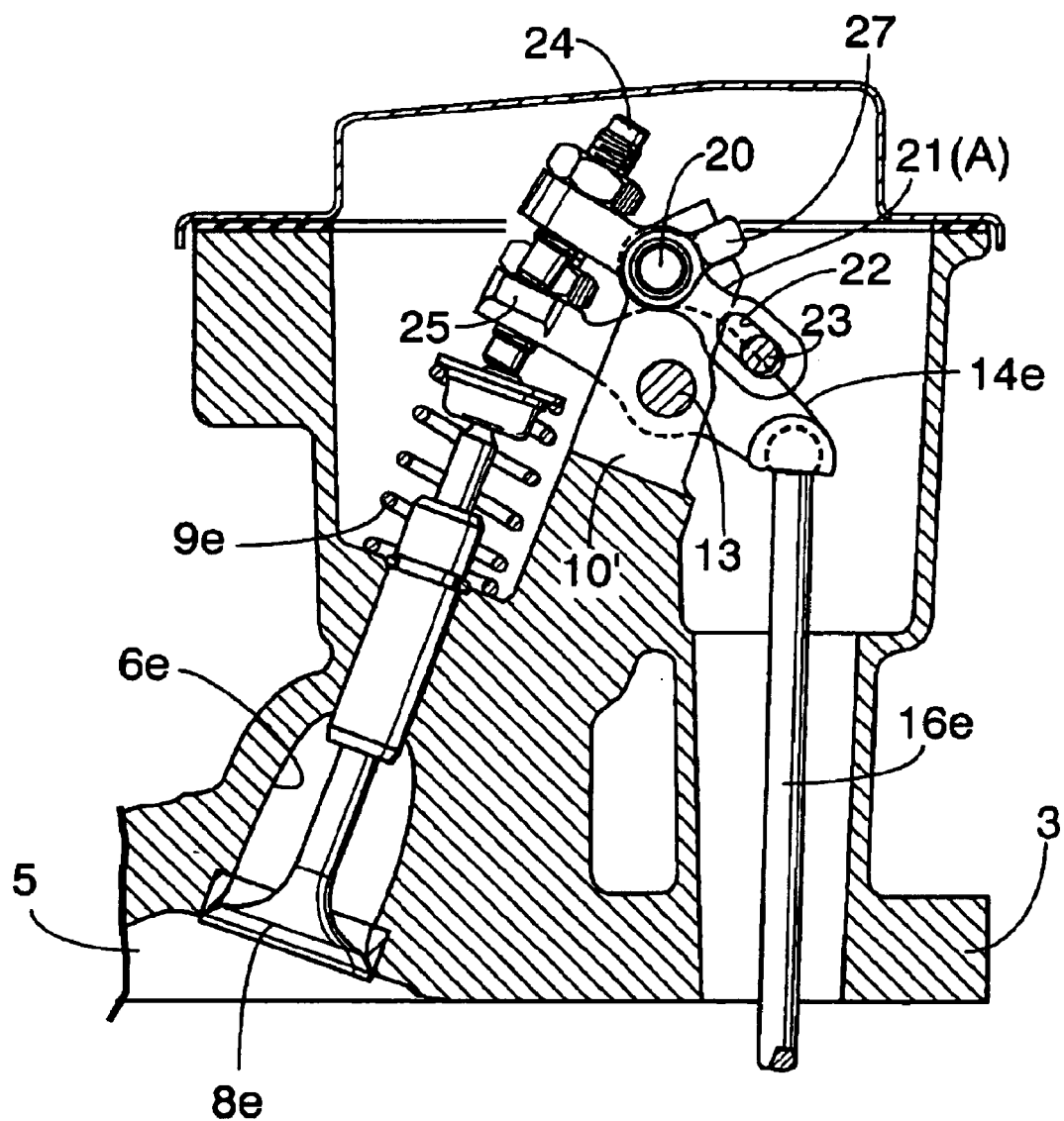
FIG. 4 is a sectional view taken along the line 4—4 in FIG. 1.
Figure 5:
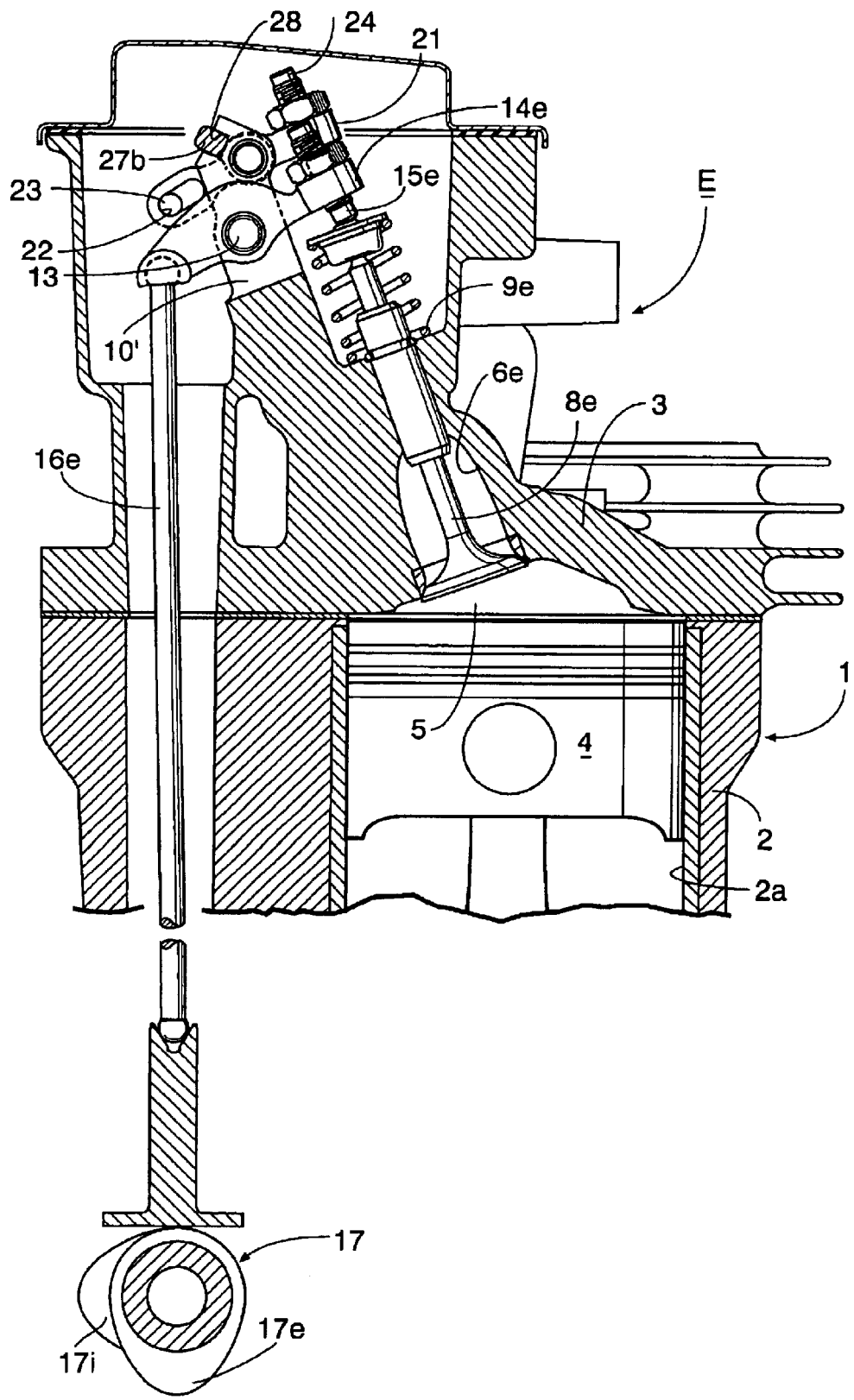
FIG. 5 is a sectional view taken along the line 5—5 in FIG. 1.
Figure 6:
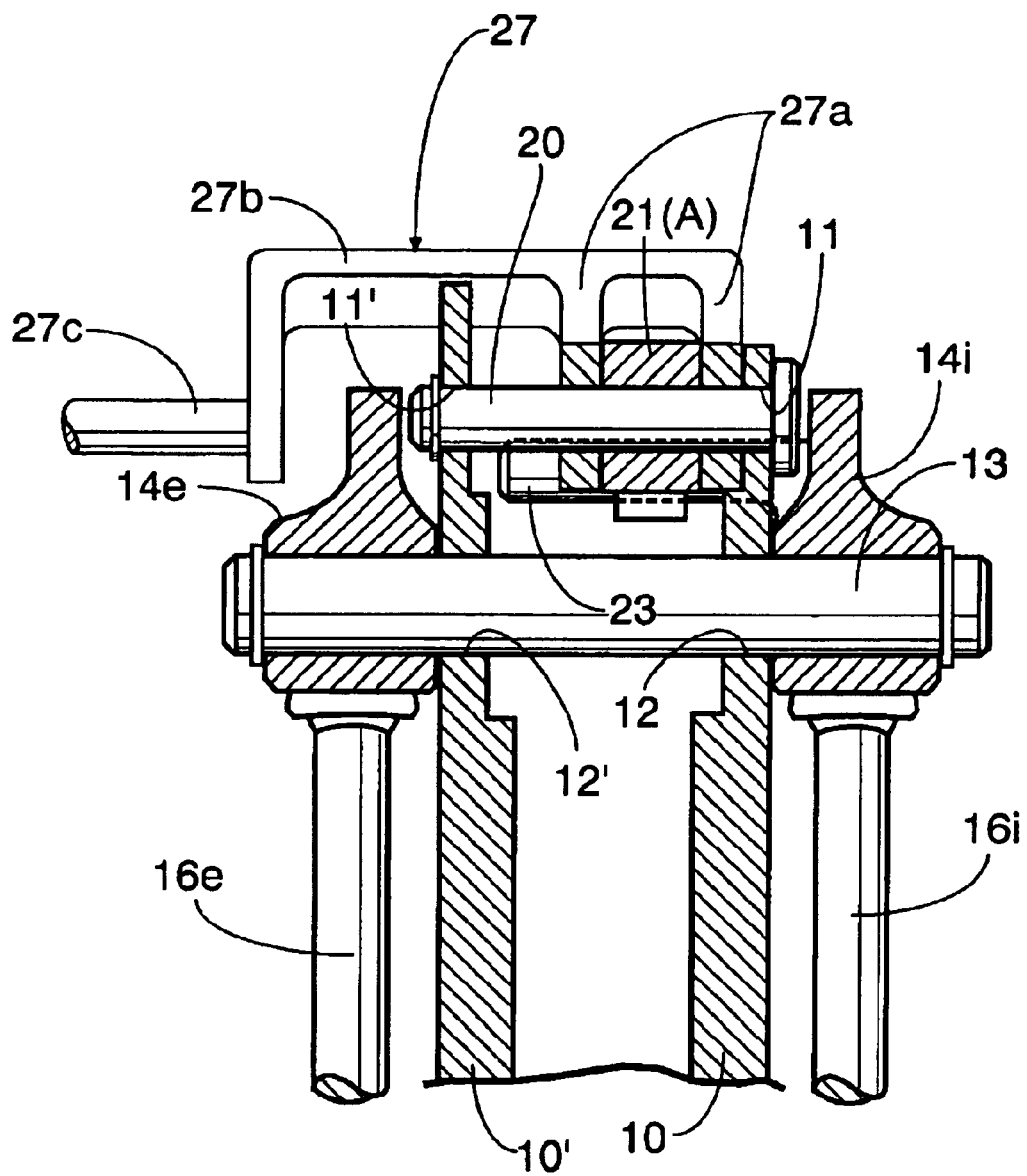
FIG. 6 is a sectional view taken along the line 6—6 in FIG. 1.
Figure 7:
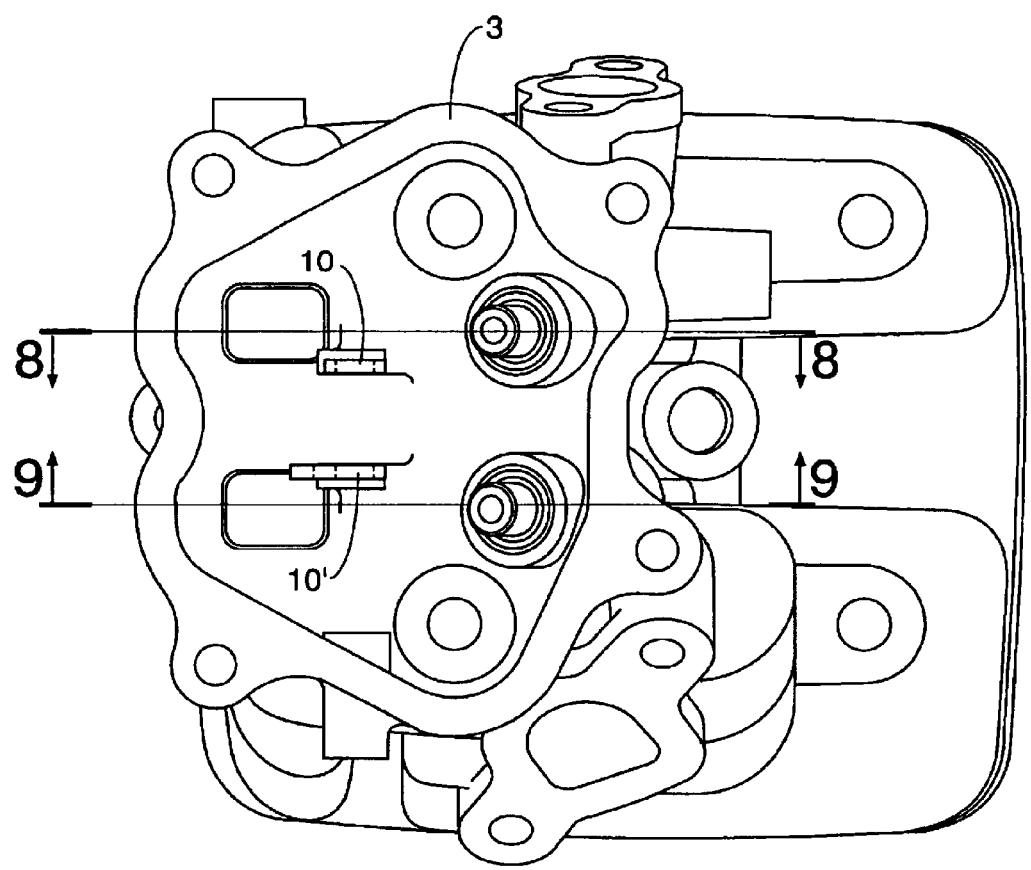
FIG. 7 is a plan view of a cylinder head of the internal combustion engine.
Figure 8:
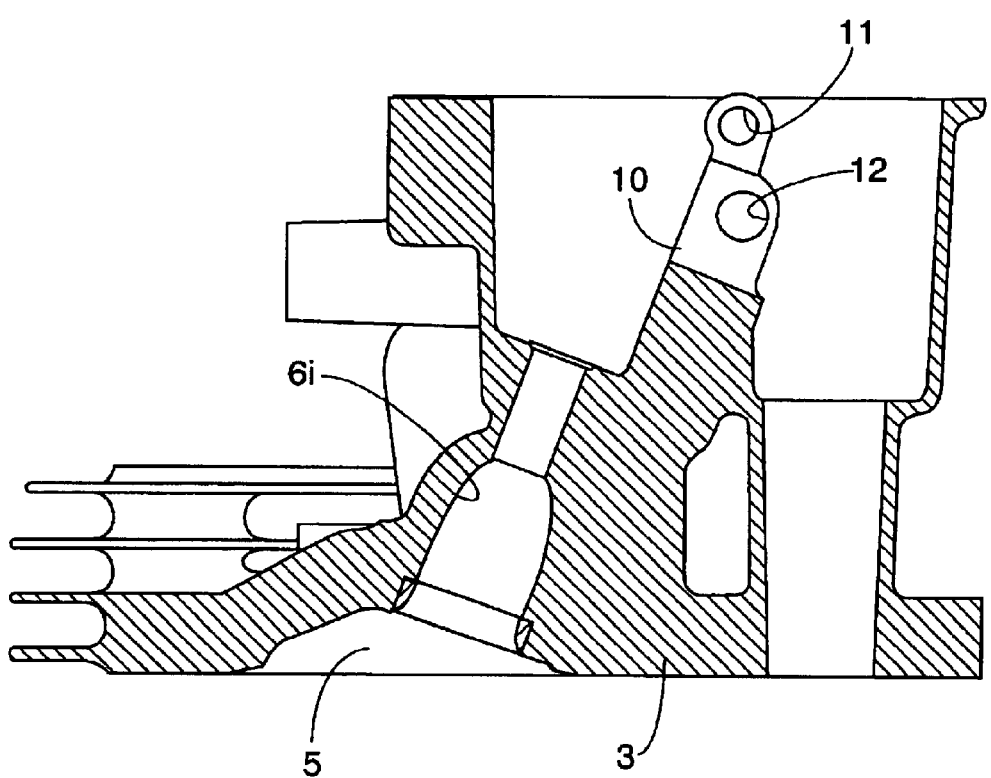
FIG. 8 is a sectional view taken along the line 8—8 in FIG. 7.
Figure 9:
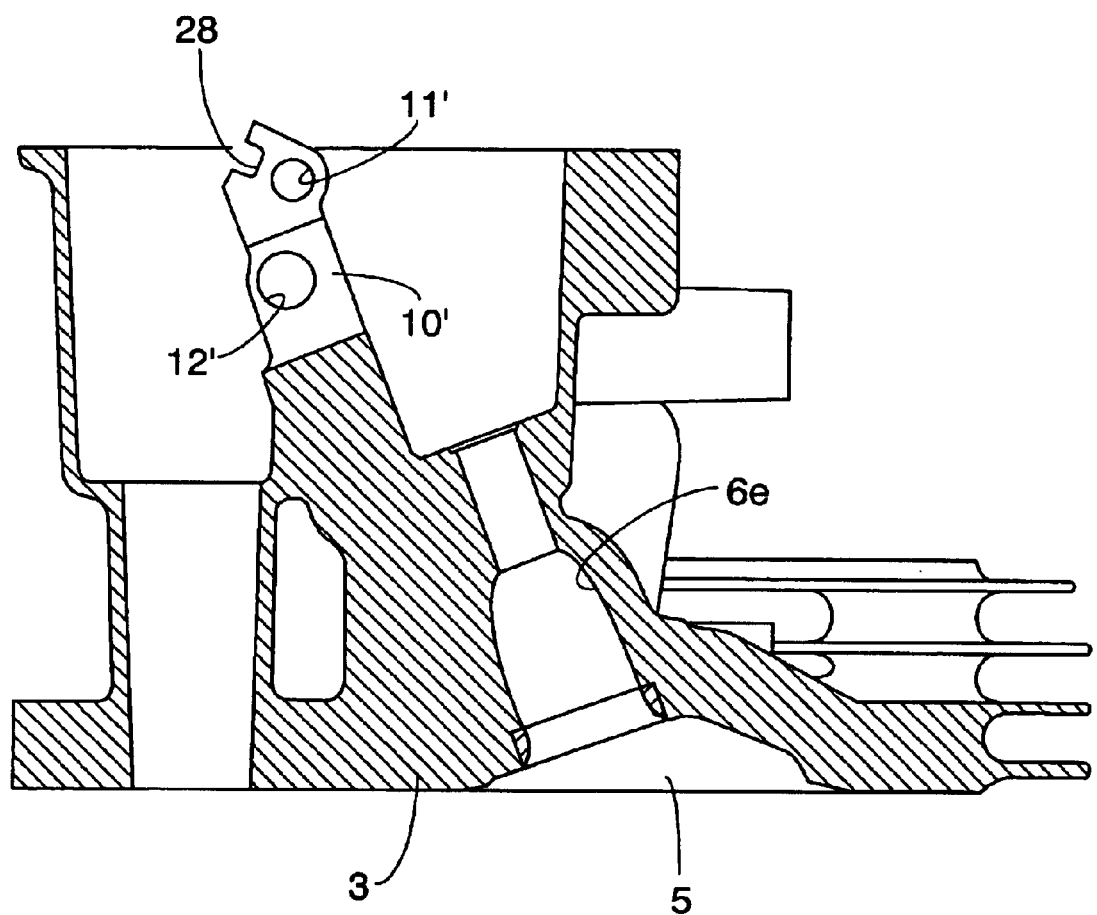
FIG. 9 is a sectional view taken along the line 9—9 in FIG. 7.

Now, preferred embodiments of the invention will be described with reference to the accompanying drawings.

First, a first embodiment of the invention shown in FIGS. 1 to 16 will be described.

In FIGS. 1 to 6, an engine body 1 of an internal combustion engine E includes a cylinder block 2 having a cylinder bore 2a into which a piston 4 is fitted, and a cylinder head 3 joined to a top end of the cylinder block 2. The cylinder head 3 has a combustion chamber 5 communicating with the cylinder bore 2a, and an intake port 6i and an exhaust port 6e opening into a ceiling surface of the combustion chamber 5. A carburetor 7 (see FIG. 10) is connected to an upstream end of the intake port 6i. An exhaust muffler (not shown) is connected to a downstream end of the exhaust port 6e via an exhaust pipe.

An intake valve 8i and an exhaust valve 8e that open and close openings of the intake port 6i and the exhaust port 6e, respectively, into the combustion chamber 5 are mounted to the cylinder head 3 with their axes in parallel. Valve springs 9i and 9e that urge the intake valve 8i and the exhaust valve 8e in a valve opening direction are mounted to the intake valve 8i and the exhaust valve 8e.

As shown in FIGS. 6 to 9, the cylinder head 3 has a pair of supports 10 and 10' protruding upward. The supports 10 and 10' have a pair of upper support holes 11 and 11' and a pair of lower support holes 12 and 12'.

In FIGS. 1 to 6, a main rocker shaft 13 is supported by the lower support holes 12 and 12' of the supports 10 and 10'. An intake rocker arm 14i and an exhaust rocker arm 14e are pivotably supported by both ends of the main rocker shaft 13 protruding outward beyond the supports 10 and 10'. The intake rocker arm 14i is placed, with one end connected to a top end of the intake valve 8i via a gap adjustment bolt 15i and with the other end connected to a top end of an intake push rod 16i. The exhaust rocker arm 14e is placed, with one end connected to a top end of the exhaust valve 8e via a gap adjustment bolt 15e and with the other end connected to a top end of an exhaust push rod 16e. The intake push rod 16i and the exhaust push rod 16e are lifted and lowered, at their bottom ends, by an intake cam 17 and an exhaust cam 17e, respectively, of a camshaft 17 driven in a decelerated manner from a crankshaft (not shown).

Thus, when the intake push rod 16i and the exhaust push rod 16e are lifted, the intake rocker arm 14i and the exhaust rocker arm 14e rock in valve opening directions of the intake valve 8i and the exhaust valve 8e against closing forces of the valve springs 9i and 9e, and when the intake push rod 16i and the exhaust push rod 16e are lowered, the intake rocker arm 14i and the exhaust rocker arm 14e rock so as to allow the intake valve 8i and the exhaust valve 8e to be closed by the closing forces of the valve springs 9i and 9e.

An auxiliary rocker shaft 20 is supported by the upper support holes 11 and 11' of the supports 10 and 10'. An auxiliary rocker arm 21 placed between the supports 10 and 10' is pivotably and axially slidably supported by the auxiliary rocker shaft 20. A slot 22 is provided in one end of the auxiliary rocker arm 21. An interlock pin 23 protruding from one side of the intake rocker arm 14i in parallel with the main rocker shaft 13 is axially slidably fitted into the slot 22. A gap adjustment bolt 24 is threaded onto the other end of the auxiliary rocker arm 21. A connection piece 25 is formed on the exhaust rocker arm 14e correspondingly to the gap adjustment bolt 24.

Thus, the auxiliary rocker arm 21 can move on the auxiliary rocker shaft 20 between a non-operating position A where the gap adjustment bolt 24 is laterally removed from above the connection piece 25, and an operating position B where the gap adjustment bolt 24 faces a top surface of the connection piece 25. When the intake rocker arm 14i rocks in the valve opening direction of the intake valve 8i at the operating position B of the auxiliary rocker arm 21, the auxiliary rocker arm 21 that interlocks with the intake rocker arm 14i via the interlock pin 23 presses the connection piece 25 to rock the exhaust rocker arm 14e in the valve opening direction of the exhaust valve 8e. At this time, a direction of the slot 22 of the auxiliary rocker arm 21 that the interlock pin 23 engages is selected to reduce a rocking angle of the auxiliary rocker arm 21, and a valve opening lift of the exhaust valve 8e is set sufficiently smaller than a normal valve opening lift (see FIG. 12). At the operating position B of the auxiliary rocker arm 21, when the exhaust rocker arm 14e is rocked in the valve opening direction of the exhaust valve 8e by the exhaust push rod 16e, the connection piece 25 simply moves apart from the auxiliary rocker arm 21 and is not interfered with by the auxiliary rocker arm 21. Thus, the auxiliary rocker arm 21 and the connection piece 25 constitute one-way connection means 26 that connects between the rocker arms 14i and 14e only when the intake rocker arm 14i rocks in the valve opening direction of the intake valve 8i.

A shift fork 27 for switching the auxiliary rocker arm 21 between the non-operating position A and the operating position B, is connected to the auxiliary rocker arm 21. The shift fork 27 includes a fork 27a that clamps the auxiliary rocker arm 21 and is slidably supported on the auxiliary rocker shaft 20, a guide 27b that extends from one end of the fork 27a and slidably engages a guide groove 28 of the support 10' on the side of the exhaust rocker arm 14e, and a rod 27c that is connected to an end of the guide 27b and passes through one side wall of the cylinder head 3. The rod 27c is operated by a negative pressure type actuator 30.

The negative pressure type actuator 30 includes a shell 31 mounted and secured to an appropriate position of the internal combustion engine E, a diaphragm 34 that partitions the interior of the shell 31 into an atmosphere chamber 32 and a negative pressure chamber 33, and a return spring 35 that urges the diaphragm 34 toward the non-operating position A of the auxiliary rocker arm 21 in the negative pressure chamber 33. An outer end of the rod 27c passing through one side wall of the shell 31 is connected to a central portion of the diaphragm 34. A negative pressure introduction pipe 36 leading to the negative pressure chamber 33 is formed on the other side wall of the shell 31. The negative pressure introduction pipe 36 is connected to a negative pressure taking-out hole 41 opening into an intake path 40 of the carburetor 7 via a negative pressure conduit 42, as shown in FIG. 10.

Figure 11:
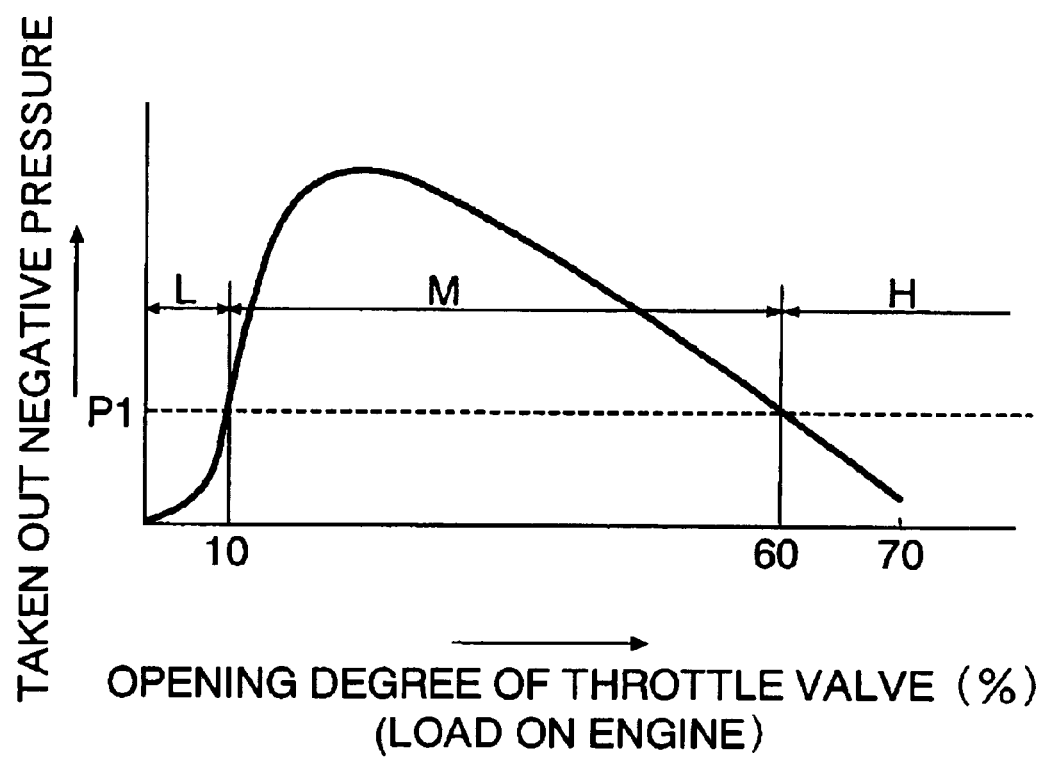
FIG. 11 is a graph of a characteristic of a taken-out negative pressure from the carburetor.
Figure 12:
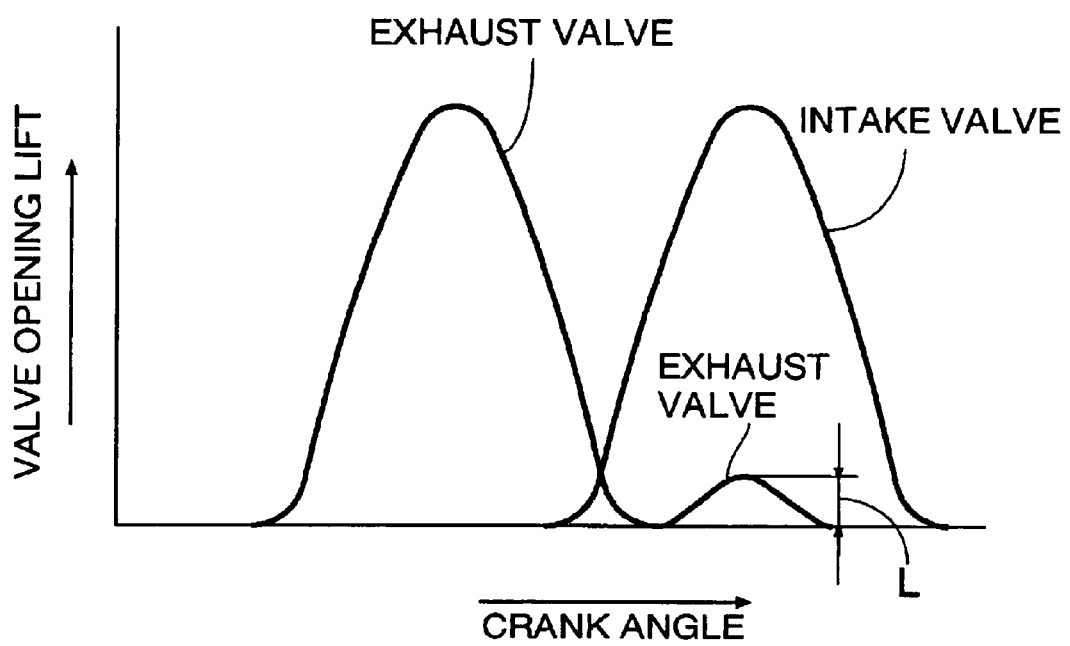
FIG. 12 is a graph of opening and closing timing of an intake valve and an exhaust valve of the internal combustion engine.
Figure 13:
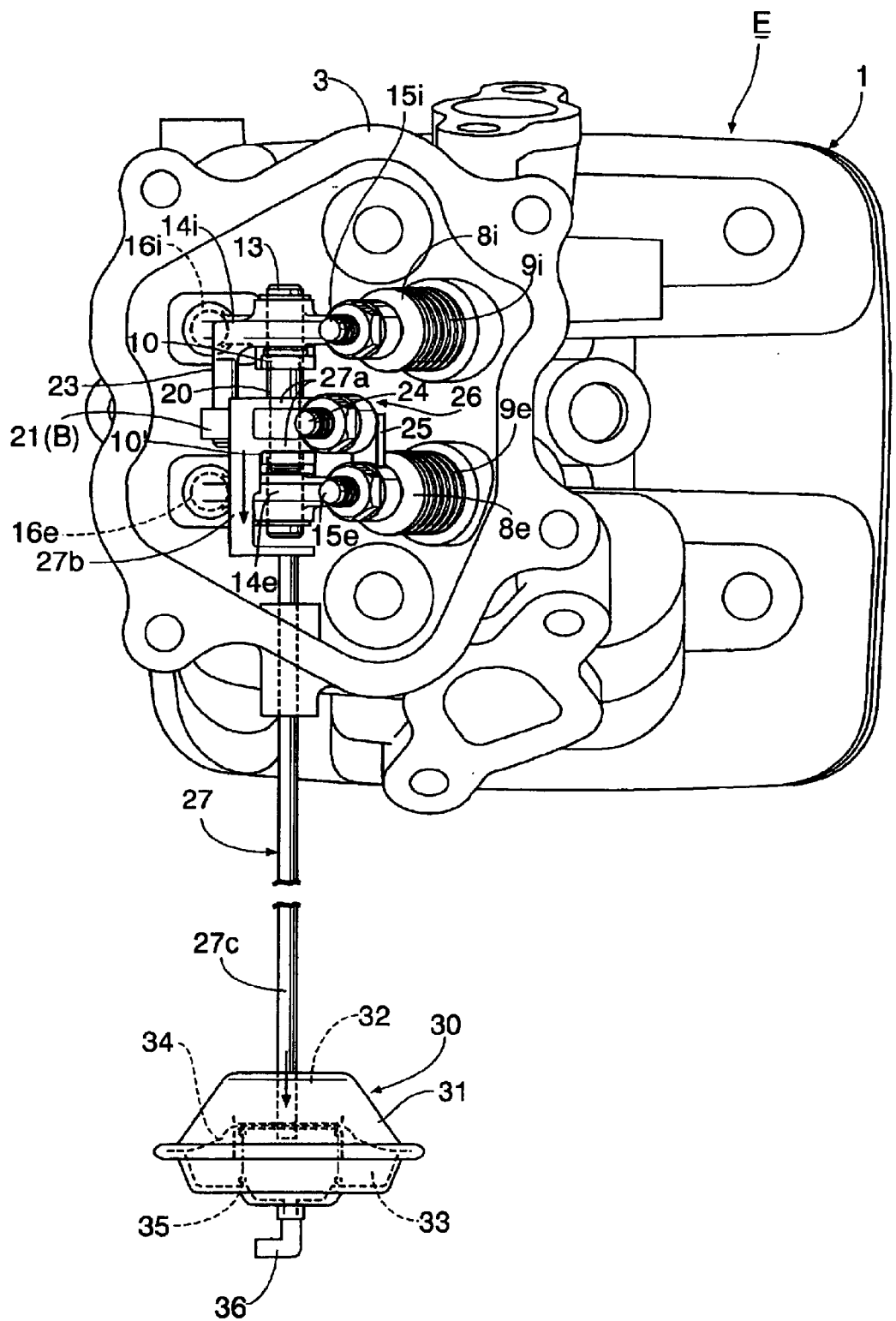
FIG. 13 shows an exhaust gas reflux state and corresponds to FIG. 1.
Figure 14:
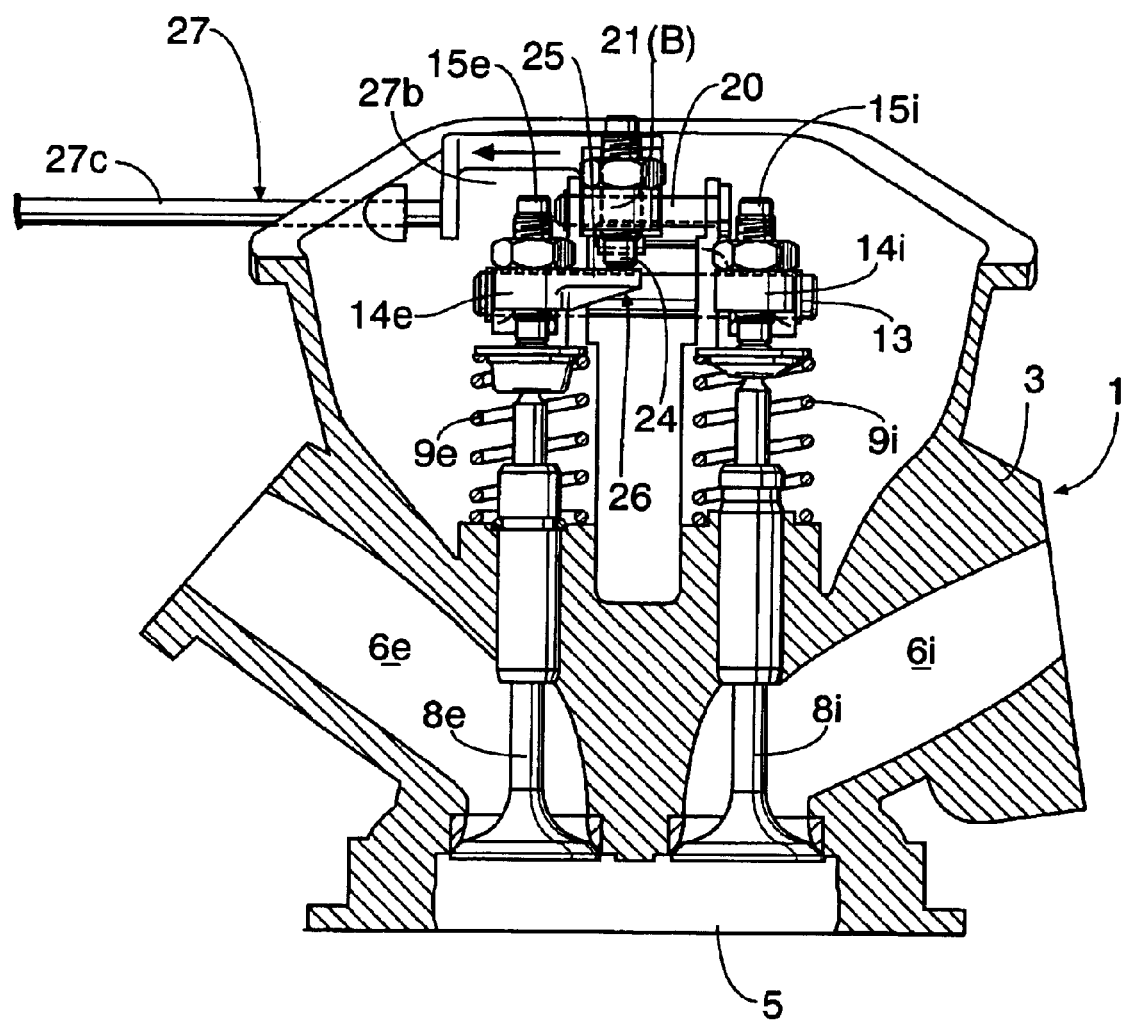
FIG. 14 shows a state immediately before exhaust gas reflux and corresponds to FIG. 2.
Figure 15:
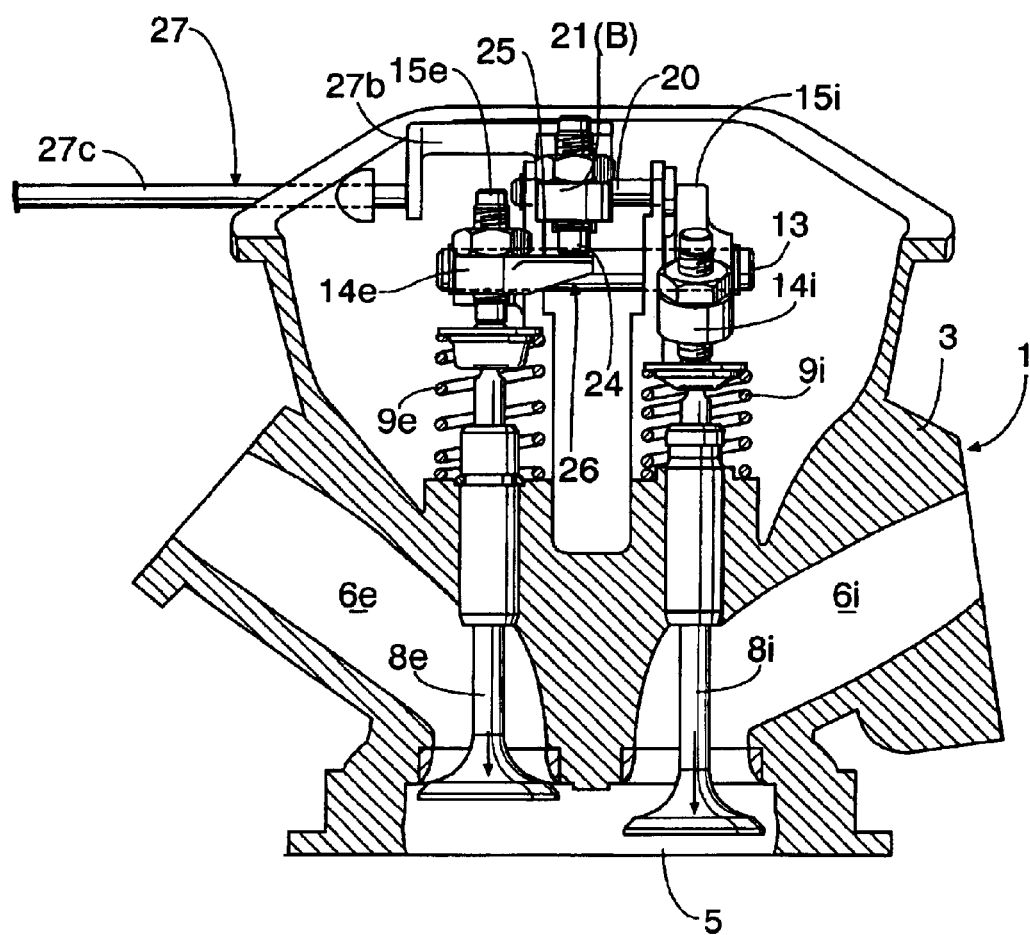
FIG. 15 shows an exhaust gas reflux state and corresponds to FIG. 2.
Figure 16:
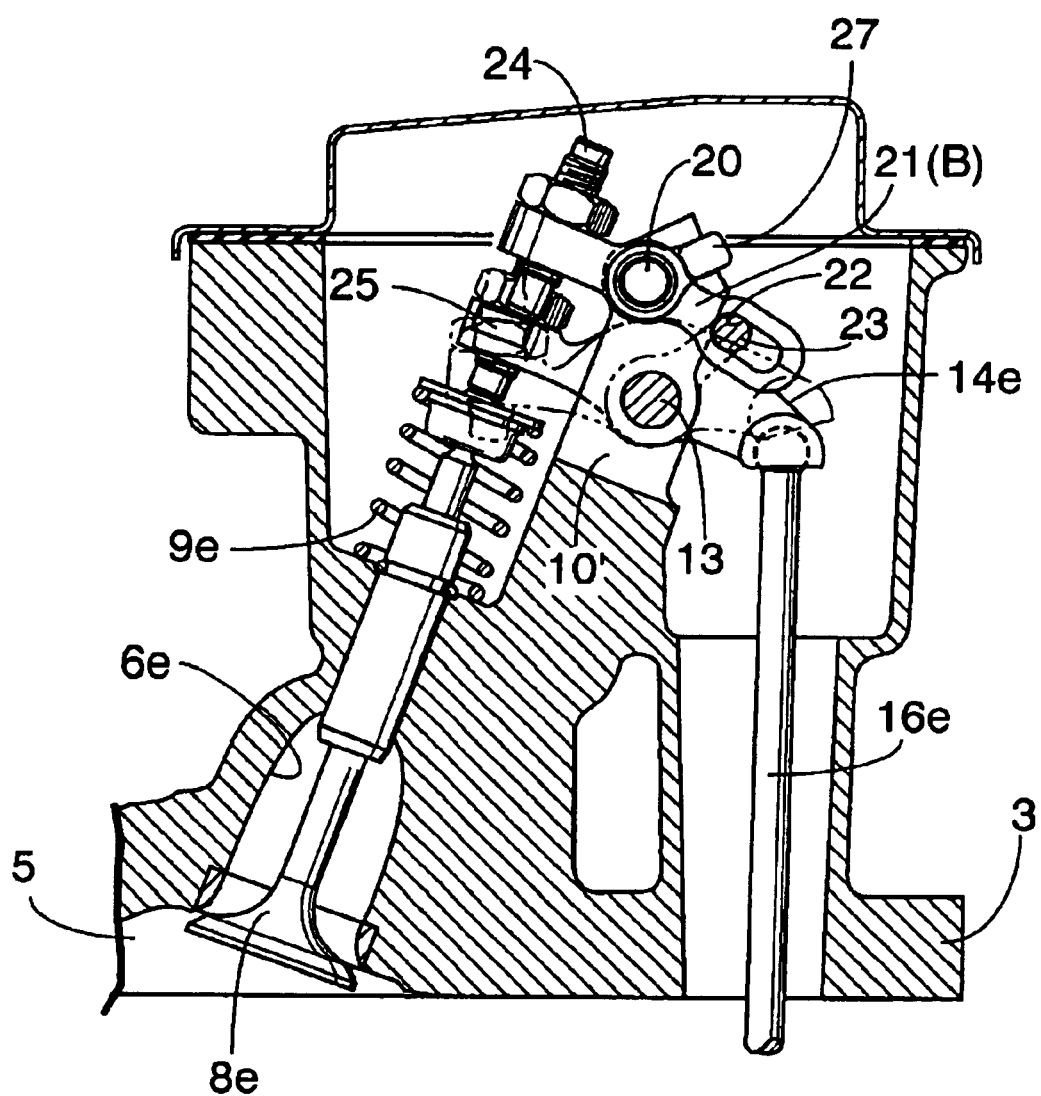
FIG. 16 shows an exhaust gas reflux state and corresponds to FIG. 4.

The opening of the negative pressure taking-out hole 41 into the intake path 40 is situated upstream of a throttle valve 43 that opens and closes the intake path 40, when the throttle valve 43 occupies an idle opening degree position, and relatively moves downstream of the throttle valve 43 when the throttle valve 43 is opened to a predetermined middle opening degree or more. Therefore, a negative pressure taken out from the negative pressure taking-out hole 41 during the operation of the internal combustion engine E shows a mountain-shaped characteristic depending on increase in opening degree of the throttle valve 43, as shown in FIG. 11. Thus, a set load of the return spring 35 is set so that the diaphragm 34 of the actuator 30 operates when an introduced negative pressure into the negative pressure chamber 33 reaches a predetermined value P1 or more. This causes the diaphragm 34 of the actuator 30 to enter a non-operating state in an area L from a fully-closed position to a predetermined low opening degree of the throttle valve 43 and in an area H with a predetermined high opening degree or more, and enter an operating state in an area M with a predetermined middle opening degree.

Figure 10:
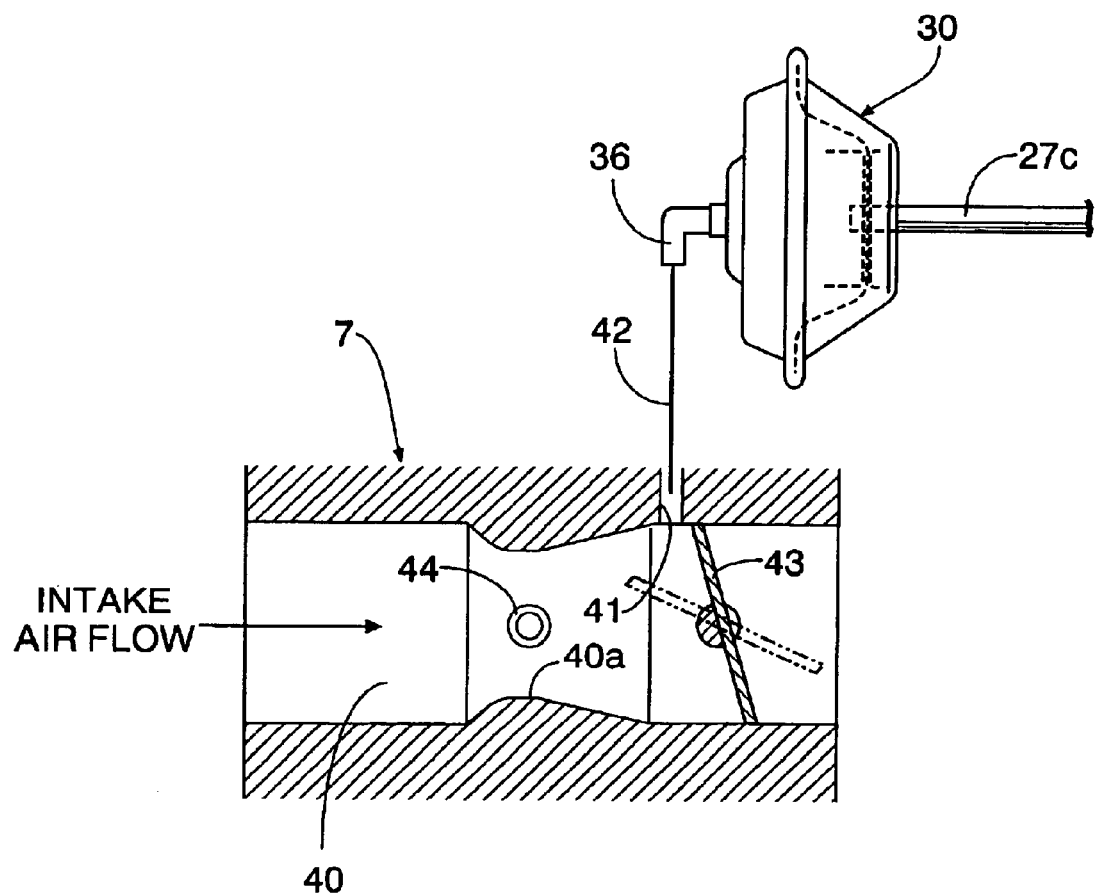
FIG. 10 is a vertical sectional view of a carburetor of the internal combustion engine.

In FIG. 10, reference numeral 44 denotes a main fuel nozzle opening into a venturi 40a of the intake path 40.

Next, operations of the first embodiment will be described.

When the negative pressure introduced into the negative pressure chamber 33 is lower than the predetermined value, and the diaphragm 34 of the actuator 30 is in the non-operating state during the operation of the internal combustion engine, as shown in FIGS. 1 to 4, the shift fork 27 holds the auxiliary rocker arm 21 at the non-operating position A by the set load of the return spring 35 in the shell 31, to remove the gap adjustment bolt 24 of the auxiliary rocker arm 21 from the connection piece 25 of the exhaust rocker arm 14e. Therefore, when the intake push rod 16i and the exhaust push rod 16e are lifted and lowered depending on rotation of the camshaft 17, the intake rocker arm 14i and the exhaust rocker arm 14e rock and cooperate with the valve springs 9i and 9e, to open and close the intake valve 8i and the exhaust valve 8e, respectively. At this time, rocking of the intake rocker arm 14i is transferred to the auxiliary rocker arm 21 via the interlock pin 23 to rock the auxiliary rocker arm 21, but the auxiliary rocker arm 21 holds the gap adjustment bolt 24 away from the connection piece 25 and does not interfere with the exhaust rocker arm 14e. Thus, the internal combustion engine E can perform intake and exhaust strokes as normal.

When the negative pressure introduced into the negative pressure chamber 33 reaches the predetermined value or more, and the diaphragm 34 of the actuator 30 operates to pull the shift fork 27 to move the auxiliary rocker arm 21 into the operating position B, the gap adjustment bolt 24 rides on the connection piece 25 of the exhaust rocker arm 14e. Thus, as shown in FIGS. 12 to 15, when the intake rocker arm 14i rocks to open the intake valve 8i during the intake stroke, the auxiliary rocker arm 21 rocks in an interlocked manner to press down the connection piece 25 via the gap adjustment bolt 24. As a result, the exhaust rocker arm 14e rocks to slightly open the exhaust valve 8e. In this way, when the exhaust valve 8e is opened during the intake stroke, the exhaust gas remaining on the side of the exhaust port 6e is sucked into the combustion chamber 5, that is, the exhaust gas is refluxed. During combustion of air-fuel mixture during an expansion stroke in a later stage, the exhaust gas inhibits an excessive increase in combustion temperature of the air-fuel mixture, to reduce NOx concentration in the exhaust gas.

During an exhaust stroke when the auxiliary rocker arm 21 is at the operating position B, when the exhaust push rod 16e is lifted to rock the exhaust rocker arm 14e in the valve opening direction of the exhaust valve 8e, the connection piece 25 of the exhaust rocker arm 14e moves apart from the gap adjustment bolt 24 of the auxiliary rocker arm 21, and is thus not interfered with the auxiliary rocker arm 21 and can open the exhaust valve 8e as normal.

As described above, the actuator 30 enters the operating state, that is, an exhaust gas reflux state only when the throttle valve 43 is in the area M with the predetermined middle opening degree. In the area L from the fully-closed position to the predetermined low opening degree of the throttle valve 43 and the area H with the predetermined high opening degree or more, the actuator 30 is not operated, and the exhaust gas is not refluxed. This allows stable combustion and reduction in fuel consumption during low speed operation including idling of the internal combustion engine E, and securing high output during high load operation.

Further, the exhaust valve 8e is used for the exhaust gas reflux, and thus as compared with a conventional apparatus having a special exhaust gas reflux valve, opening areas of the intake port 6i and the exhaust port 6e opening into the combustion chamber 5 can be increased, to thereby improve output performance of the internal combustion engine E. Besides, a simple configuration can be obtained since there is no increase in the number of valves, to thereby provide an inexpensive exhaust gas reflux apparatus.

Figure 17:
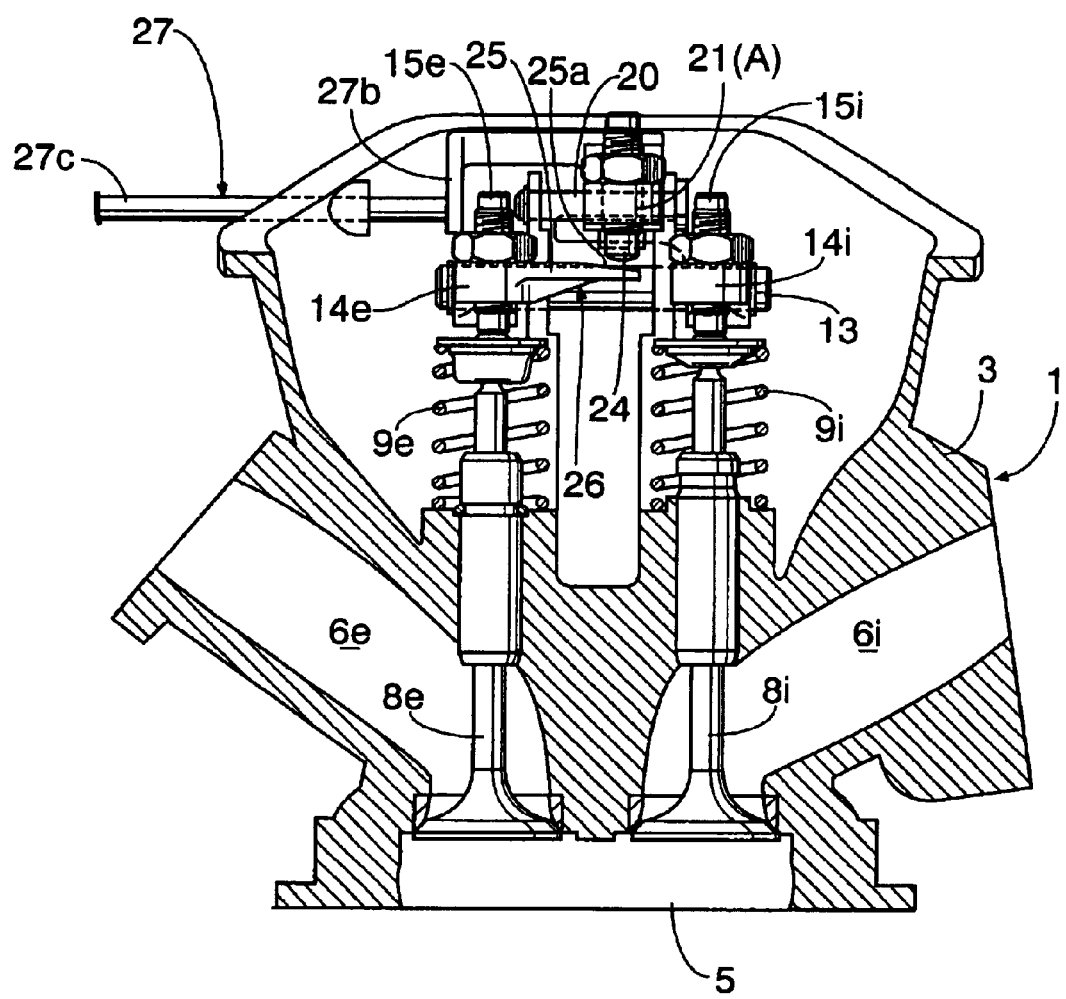
FIG. 17 shows a second embodiment of the invention and corresponds to FIG. 2.
Figure 18:
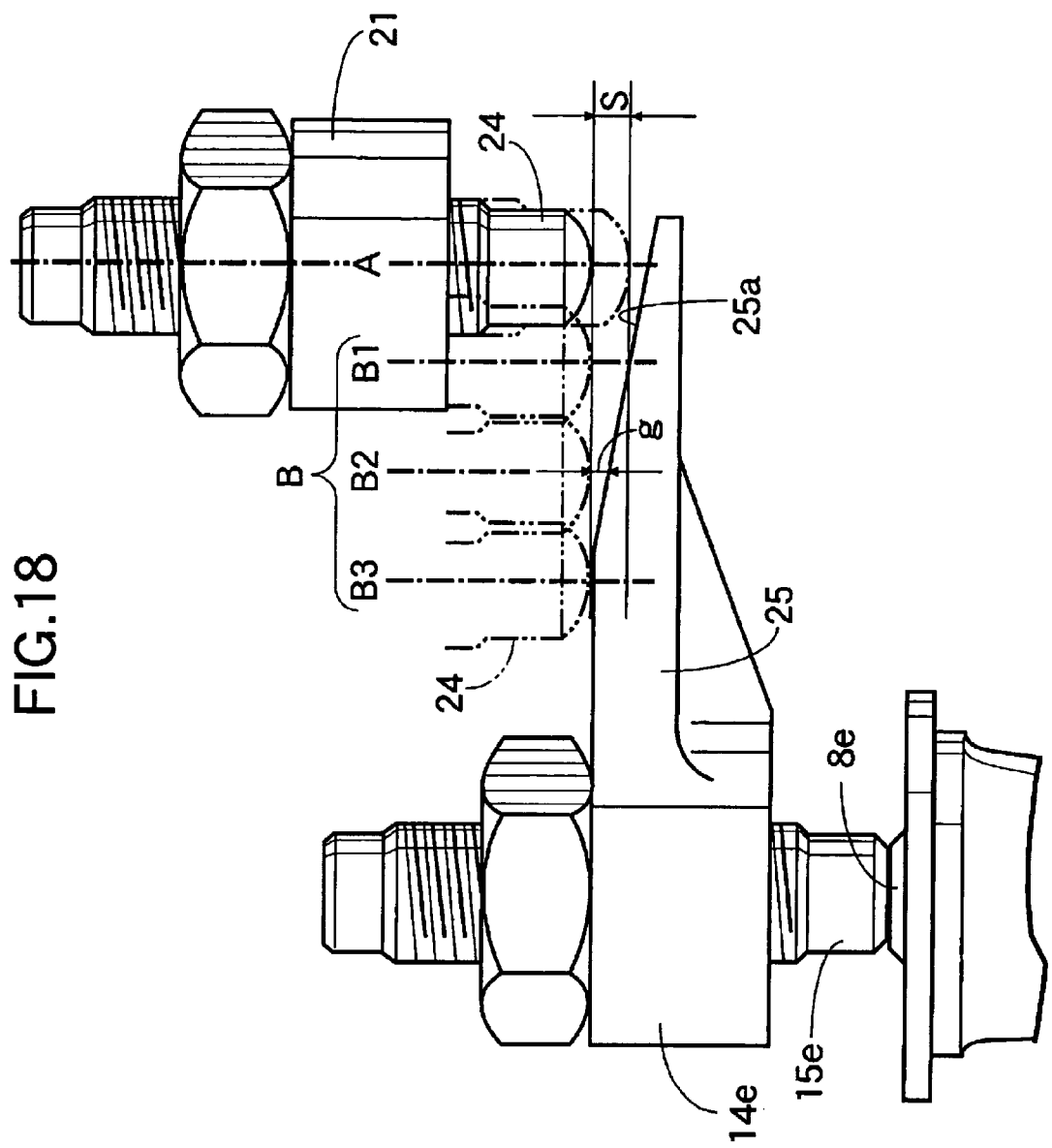
FIG. 18 illustrates an operation of the second embodiment.

Next, a second embodiment of the invention shown in FIGS. 17 and 18 will be described In the one-way connection means 26, the actuator 30 (see FIG. 1) controls movement of the auxiliary rocker arm 21 from the non-operating position A to an operation start point B1 and to an operation limit point B3. Specifically, the operating position B of the auxiliary rocker arm 21 is controlled within a range from the operation start point B1 via an operation middle point B2 to the operation limit point B3.

On the other hand, the connection piece 25 provided on the exhaust rocker arm 14e has a slope 25a always facing a tip end of the gap adjustment bolt 24 of the auxiliary rocker arm 21 regardless of the non-operating position A, the operation start point B1, the operation middle point B2 and the operation limit point B3 of the auxiliary rocker arm 21. The slope 25a descends toward the non-operating position A of the auxiliary rocker arm 21. The slope 25a causes a gap g between the gap adjustment bolt 24 of the auxiliary rocker arm 21 and the connection piece 25 of the exhaust rocker arm 14e to increase toward the non-operating position A of the auxiliary rocker arm 21.

The slope 25a is formed so that, when an operation stroke axially of the exhaust valve 8e of the gap adjustment bolt 24 associated with rocking of the auxiliary rocker arm 21 around the auxiliary rocker shaft 20 is S which is constant, the operation stroke S and the gap g have relationships according to the following expressions.

When the auxiliary rocker arm 21 is at the non-operating position A . . . g>S
When the auxiliary rocker arm 21 is at the operation start point B1 . . . g=S
When the auxiliary rocker arm 21 is at the operation middle point B2 . . . g<S
When the auxiliary rocker arm 21 is at the operation limit point B3 . . . g=0

When the auxiliary rocker arm 21 is at the operation limit point B3, the gap g between the gap adjustment bolt 24 and the connection piece 25 is regarded as zero.

Other configurations are the same as in the former embodiment, and thus the same reference numerals and symbols denote parts corresponding to those in the former embodiment, and descriptions thereof will be omitted.

Thus, when the actuator 30 is in the non-operating state, and the auxiliary rocker arm 21 is at the non-operating position A, even if the auxiliary rocker arm 21 rocks around the auxiliary rocker shaft 20, the gap adjustment bolt 24 does not contact the connection piece 25 according to the expression g>S. When the actuator 30 moves the auxiliary rocker arm 21 to the operation start point B1, the gap adjustment bolt 24 starts to contact the connection piece 25 during the rocking of the auxiliary rocker arm 21. When the auxiliary rocker arm 21 is moved to the operation middle point B2, the gap adjustment bolt 24 presses down the exhaust valve 8e via the connection piece 25 according to the expression g<S during the rocking of the auxiliary rocker arm 21 to provide a valve opening lift L of S−g to the exhaust valve 8e. When the auxiliary rocker arm 21 is moved to the operation limit point B3, the valve opening lift L of the exhaust valve 8e becomes L=S according to the expression g=0. Thus, the valve opening lift L (see FIG. 12) provided to the exhaust valve 8e from the auxiliary rocker arm 21 becomes L=(S−g), and changes depending on changes of g.

As shown in FIG. 11, in the middle opening degree area M of the throttle valve 43 where the actuator 30 is in the operating state, the negative pressure introduced into the negative pressure chamber 33 of the actuator 30 from the carburetor 7 (see FIG. 10) reaches a peak at a relatively low opening degree (when an engine load is relatively low), and then decreases with increase in opening degree (increase in load). The actuator 30 operates the auxiliary rocker arm 21 depending on the changes of the introduced negative pressure, and thus the valve opening lift L provided to the exhaust valve 8e by the auxiliary rocker arm 21 is high when the engine load is relatively low in the middle opening degree area M of the throttle valve 43, and then decreases with increase in engine load. Therefore, the amount of exhaust gas refluxed into the combustion chamber 5 is adjusted depending on the engine load, to thereby allow stable combustion and reduction in NOx concentration in the exhaust gas.

The invention is not limited to the above described embodiments, but various changes in design may be made without departing from the subject matter of the invention.

What is claimed is:

1. An exhaust gas reflux apparatus for an internal combustion engine having an intake rocker arm and an exhaust rocker arm that are pivotably supported on an engine body and driven to open and close an intake valve and an exhaust valve, respectively, wherein one-way connection means is provided between the intake rocker arm and the exhaust rocker arm, the one-way connection means moving between a non-operating position where the intake and exhaust rocker arms are released and an operating position where the intake and exhaust rocker arms are connected to open the exhaust valve only when the intake rocker arm rocks in a valve opening direction of the intake valve, and wherein an actuator for switching the one-way connection means between the non-operating position and the operating position is connected to the one-way connection means.

2. The exhaust gas reflux apparatus for an internal combustion engine according to claim 1, wherein the actuator has a negative pressure type configuration that operates when a negative pressure introduced into a negative pressure chamber of the actuator reaches a predetermined value or more, and wherein the negative pressure chamber communicates with a negative pressure taking-out hole opening into an intake path of a carburetor, the negative pressure of the predetermined value or more being taken out from the intake path through the negative pressure taking-out hole in a predetermined middle opening degree area of a throttle valve.

3. The exhaust gas reflux apparatus for an internal combustion engine according to claim 1 or 2, wherein the one-way connection means includes an auxiliary rocker arm that is pivotably supported on the engine body so as to rock in an interlocked manner with the intake rocker arm and switched between a non-operating position and an operating position by the actuator, and a connection piece that is provided on the exhaust rocker arm and engages the auxiliary rocker arm only when the intake rocker arm rocks in the valve opening direction of the intake valve at the operating position of the auxiliary rocker arm.

4. The exhaust gas reflux apparatus for an internal combustion engine according to claim 1 or 2, wherein the actuator is configured so that an operation stroke changes depending on an engine load, and wherein the one-way connection means is configured so that a valve opening lift of the exhaust valve by the one-way connection means is changed depending on the operation stroke of the actuator.

5. The exhaust gas reflux apparatus for an internal combustion engine according to claim 4, wherein the one-way connection means includes an auxiliary rocker arm that is pivotably supported on the engine body so as to rock in an interlocked manner with the intake rocker arm, the operation position of the one-way connection means being controlled from an operation start point to an operation limit point by the actuator, and a connection piece that is provided on the exhaust rocker arm and engages the auxiliary rocker arm only when the intake rocker arm rocks in the valve opening direction of the intake valve within a range from the operation start point to the operation limit point of the auxiliary rocker arm, and wherein the connection piece is formed so that a gap between the connection piece and the auxiliary rocker arm changes depending on movement of the auxiliary rocker arm from the operation start point to the operation limit point.

* * * * *